US006628885B1

United States Patent
Wilkie et al.

(10) Patent No.: US 6,628,885 B1
(45) Date of Patent: Sep. 30, 2003

(54) FIBER-OPTIC ASSEMBLY WITH SHEATHED LIGHT-TRANSMITTING CORE

(76) Inventors: Mark Ian Wilkie, 7 Bush Road, London SE8 5AP (GB); Sarah Bilbey, The Hide, 21 Clifton Road, Chesham Bois, Amersham, Buckinghamshire HP6 5PP (GB)

( * ) Notice: Subject to any disclaimer, the term of this patent is extended or adjusted under 35 U.S.C. 154(b) by 0 days.

(21) Appl. No.: 09/958,534
(22) PCT Filed: Apr. 13, 2000
(86) PCT No.: PCT/GB00/01406
§ 371 (c)(1),
(2), (4) Date: Dec. 17, 2001
(87) PCT Pub. No.: WO00/61991
PCT Pub. Date: Oct. 19, 2000

(30) Foreign Application Priority Data

Apr. 13, 1999 (GB) .............................................. 9908259

(51) Int. Cl.$^7$ .................................................. G02B 6/00
(52) U.S. Cl. ........................ 385/147; 385/120; 385/901; 362/554
(58) Field of Search ................................. 385/147, 115, 385/116, 119, 120, 901; 362/551, 554

(56) References Cited

U.S. PATENT DOCUMENTS

| 4,234,907 A | 11/1980 | Daniel |
| 4,885,663 A | 12/1989 | Parker |
| 4,907,132 A | 3/1990 | Parker |
| 5,568,964 A | 10/1996 | Parker et al. |
| 6,396,985 B2 * | 5/2002 | Lowry et al. ................ 385/120 |
| 6,418,267 B1 * | 7/2002 | Lowry ......................... 385/147 |

* cited by examiner

Primary Examiner—Phan T. H. Palmer
(74) Attorney, Agent, or Firm—Davis & Bujold, P.L.L.C.

(57) ABSTRACT

A woven fiber-optic sheet (1) has warp strands (2) formed by sheathed bundles of fine optic-fibers (4). The fibers (4) of each strand (2) are broken pseudo-randomly, different ones at different locations along its length so that light transmitted into the strands (2) from a source (7) escapes from the various locations (8) to radiate through the transparent sheathing (5). Decorative effect is intensified by periodic light-color change being a rotating multi-color filter (9) to distribute different colors to different strands (2). The sheet (1) is woven with metal wire (3), plastics filament or fiber-optic strands as the weft, and the fibers (4) are broken before, during or after weaving.

15 Claims, 1 Drawing Sheet

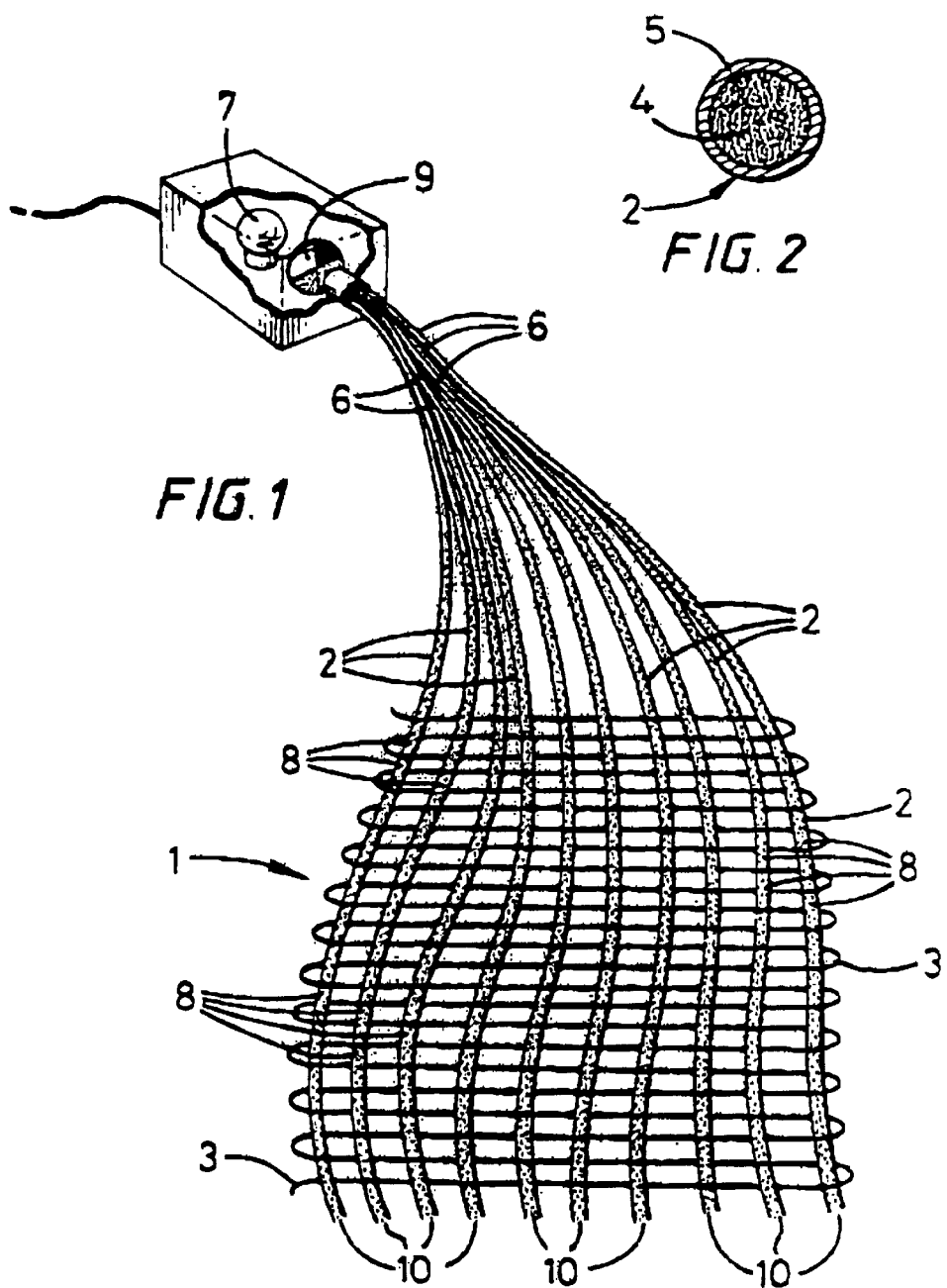

FIBER-OPTIC ASSEMBLY WITH SHEATHED LIGHT-TRANSMITTING CORE

FIELD OF THE INVENTION

This invention relates to fibre-optics, and is particularly concerned with fibre-optic assemblies of a kind for providing distributed emission of light, and with methods of forming such assemblies.

BACKGROUND OF THE INVENTION

Fibre-optic assemblies of the above-specified kind are already known from U.S. Pat. No. 4,234,907 in which optical fibres that are woven in the manner of a fabric, are scratched or notched at distributed locations along their lengths such that light transmitted along the fibres radiates from those locations. This distributed-light effect may be utilised, for example, for decorative or safety purposes.

SUMMARY OF THE INVENTION

It is one of the objects of the invention to provide an improved form of fibre-optic assembly of said above-specified kind.

According to one aspect of the invention a fibre-optic assembly for providing distributed emission of light comprises a multiplicity of fibre-optic strands retained together, wherein each strand comprises a sheathed bundle of optical fibres with discontinuities in the fibres distributed at spaced locations along the strand.

The use of sheathed bundles of optical fibres as the fibre-optic strands, and accommodating discontinuities in the fibres within the sheathing, enables fine optical fibres to be used and the discontinuities to be provided simply by breaks in the fibres. The structural integrity of the fibre-optic strands is maintained by the strand-sheathing, and the difficult task of notching or scratching individual fibres as taught by U.S. Pat. No. 4,234,907, is avoided. This notching or scratching of the fibre strands tends to weaken the fibres and so it is necessary to use thicker fibres than might otherwise be necessary or desirable; the present invention allows a greater degree of choice of strand thickness in that strand thickness is substantially unaffected by the provision of the discontinuities.

According to a feature of the present invention a fibre-optic assembly for providing distributed emission of light comprises a multiplicity of fibre-optic strands bonded together into a sheet, wherein each strand comprises a sheathed bundle of optical fibres with breaks in the fibres distributed at spaced locations along the strand.

The sheet may have the form of a woven fabric with the fibre-optic strands providing, in whole or in part, the warp and/or the weft. More especially, the fibre-optic strands may provide the warp, and the weft may be provided by filaments of plastics (for example, nylon) or metal. The resulting fabric may be used for decorative and/or safety purposes in the context of upholstery, flooring, curtaining, drapes, wall-coverings and wall-hangings, screening, clothing and lighting generally. It may also be incorporated into furniture, for example, into the tops of tables or into counter-tops or other serving surfaces of bars and restaurants, and may be sculpted into works of art.

The sheathing of the individual bundles, which may be of a plastics material (for example, polyvinyl chloride), may be transparent or translucent and encase or encapsulate the optical fibres of the bundle along substantially the whole of its length. Each bundle may comprise more than 100 optical fibres.

The fibre-optic assembly may be used in combination with means for transmitting light into the fibres of the strands so that light is radiated from the distributed locations where the breaks or other discontinuities exist. More especially, different colours of light may be transmitted into different ones of the strands, and the distribution of colours may be varied as between the different strands periodically to provide a changing multi-coloured visual effect.

In accordance with a further object and aspect of the invention there is provided a method of forming a fibre-optic light-emitting assembly wherein a multiplicity of fibre-optic strands each comprising a sheathed bundle of optical fibres, are bonded together, and fibres of each strand are broken at spaced locations along the length of the strand before, during or after the bonding operation.

The bonding operation may be a weaving operation with the fibre-optic strands providing strands of the warp and/or the weft. More especially, the fibre-optic strands may be woven together as the warp, with filaments of plastics or metal as the weft. The breaking of the fibres may take place pseudo-randomly under stresses exerted on the strands during the weaving operation.

BRIEF DESCRIPTION OF THE DRAWINGS

A fibre-optic assembly and a method of its manufacture, all in accordance with the present invention will now be described, by way of example, with reference to the accompanying drawing, in which:

FIG. 1 is a schematic representation of the fibre-optic assembly according to the invention in combination with a light source; and FIG. 2 is a cross-section to an enlarged scale of a fibre-optic strand that is typical of individual fibre-optic strands incorporated in the fibre-optic assembly of FIG. 1.

DETAILED DESCRIPTION OF THE INVENTION

Referring to FIG. 1, the fibre-optic assembly in this case has the form of a woven-fabric sheet 1 with a multiplicity of fibre-optic strands 2 as the warp and metal wire 3 (or nylon thread) as the weft bonding the strands 2 together. Although the sheet 1 is shown in FIG. 1 as though of a very wide-open weave, this is for the purposes of clarity of representation only; the weave may be as tight or loose as desired, and indeed the strands 2 may abut one another side-by-side, as too may the successive passes back and forth of the wire 3.

Each strand 2 has a diameter of approximately 2.5 mm, and as illustrated in FIG. 2, is a sheathed bundle of some 400 fine optic-fibres 4 of glass or plastics. The sheathing 5 of the bundle of fibres 4, which is of polyvinyl chloride, is transparent and is either a discrete structure (as shown) encasing the bundle of fibres 4 tightly along its length, or a tightly-encapsulating coating.

As shown in FIG. 1, the tail ends 6 of the strands 2 at one end of the sheet 1 are brought together to expose the terminal ends of the bundled fibres 4 to light emitted by a source 7. The light enters the fibres 4 for transmission along them within the strands 2. However, the fibres 4 are not all continuous throughout their lengths. More particularly, within each strand 2 many of the fibres 4 have breaks in them, some at one specific location 8 and others elsewhere at other locations 8 distributed along the length of the strand 2; only a few of the large number of locations 8 are indicated in FIG. 1. The sheathing S holds the fibres 4 together in spite of the breaks, but the light transmitted into the fibres 4 from the source 7 escapes where these discontinuities occur, to radiate through the transparent sheathing 5 at the locations 8.

The locations 8 are pseudo-randomly distributed both along the individual strands 2 and from one to the other of them. Light from the source 7 radiates from each of these locations 8 and accordingly gives a distinctive, decorative effect. This effect can be intensified by changing the colour of light transmitted from the source 7 periodically so that the sheet gives a pattern of light that changes in colour. More particularly, also, the source 7 may include, as indicated in FIG. 1, a multi-colour filter 9 which provides different colours of light to different strands 2, or groups of strands 2 within the sheet 1, and which is rotated to change the colour distribution amongst them periodically and add to the aesthetic effect. A flashing- or shimmering-light visual effect may also, or alternatively, be achieved using a rotating filter that has an opaque portion for repetitively and transitorily blocking light transmission into successive portions of the sheet 1.

Some of the light transmitted into the strands 2 at the tail ends 6 from the light source 7 will emerge from their opposite tail ends 10 if the ends 10 are left uncovered. This emergent light may be used to add to the visual effect of the sheet 1.

The tail ends 6 of the strands 2 may be brought together at the light source 7 in an ordered relationship to one another to achieve a predetermined visual pattern where different coloured lights are used for different strands 2, or groups of strands 2, across the sheet 1. A pseudo-random order may be used as an alternative according to the visual effect desired. Also, it is not necessary that all fibres 4 of the same strand 2 should be supplied with light of the same colour, but the fibres 4 if robust enough, can be freed from their sheathings 5 at the tail ends 6 and grouped with one another in an ordered or pseudo-random way to achieve whatever variegated effect is desired from the sheet 1.

The sheet 1 is manufactured using an industrial weaving machine in which the strands 2 are secured to a beam at the back of the loom arid threaded up parallel to one another as the warp. The fibres 4 of the strands 2 are in general (though not necessarily) continuous without breaks when the strands 2 are brought to the loom, but the securing and threading-up procedures may introduce breaks of some of the fibres 4 in a pseudo-random way. The threading-up is determined, as with normal-weaving practice according to thread-strength and involves heddles of the loom in dependence upon the pattern of the weave required. The tensioning of the strands 2 through the reed of the loom and in tying them off on a beam at the front of the loom, is likely to introduce further fibre-breaks; the tension is partly regulated by cross-sticks at the back of the loom.

The loom is operated to achieve a plain-weave structure using the metal wire 3 (or nylon thread) for the weft. The fibres 4 are subject to more stress during weaving, in particular by the heddles, the reed and the cross-sticks and because of the tying of the strands 2 to the beams, 60 that more breaks are introduced and existing breaks are enhanced. Once the sheet 1 has been woven, it is removed from the loom and coupled to an appropriate light source such as the source 7. More breaks in the fibres 4 can be introduced simply by subjecting the strands 2 to stress, for example by sharp bending, where they are required.

The sheet 1 may be incorporated into a casting of transparent or translucent resin to form a solid object, for example a table, a chair or a decorative or structural column. It may also be sandwiched between glass or plastics sheets, and where in the latter case the plastics material is thermoplastic, the laminate may be heated and shaped by bending.

What is claimed is:

1. A fiber-optic assembly for providing distributed emission of light in which a multiplicity of fiber-optic strands each comprising a sheathed light-transmitting core are bonded together into a sheet;

wherein the core of each strand comprises a bundle of a multiplicity of discrete optical fibers, and there are breaks in different ones of the fibers of the bundle at different locations distributed from one another along the strand.

2. The fiber-optic assembly according to claim 1, wherein the fiber-optic assembly is of a woven-fabric form with the fiber-optic strands providing strands for at least one of the warp strands and the weft strands.

3. The fiber-optic assembly according the claim 2, wherein the fiber-optic strands provide the warp, and the weft is provided by filaments of plastics or metal.

4. The fiber-optic assembly according to claim 1, wherein the sheathing of individual bundles is of a plastics material.

5. The fiber-optic assembly according to claim 1, wherein the sheathing of individual bundles is transparent or translucent and encases or encapsulates the optical fibers of the bundle along substantially the whole of its length.

6. The fiber-optic assembly according to claim 1, wherein each bundle comprises more than 100 optical fibers.

7. The fiber-optic assembly according to claim 1 in combination with means for transmitting light into the fibers of the strands so that light is radiated from the spaced locations of the strands.

8. A combination according the claim 7, wherein different colors of light are transmitted into different ones of the strands.

9. The combination according to claim 8, wherein the distribution of colors varies between the different strands periodically.

10. A method of forming a fiber-optic light-emitting assembly in which a multiplicity of fiber-optic strands each comprising a sheathed light-transmitting core, are bonded together into a sheet, the method comprising the steps of forming the core of each strand from a bundle of a multiplicity of discrete optical fibers, and breaking different ones of the fibers of the bundle at different locations distributed from one another along the strand one of before, during and after the bonding operation.

11. The method according to claim 10, further comprising the step of utilizing a weaving operation as the bonding operation with the fiber-optic strands providing strands for at least one of the warp strands and the weft strands.

12. The method according to claim 11, further comprising the step of weaving the fiber-optic strands together as the warp strands with filaments of plastics or metal as the weft strands.

13. The method according to claim 12, further comprising the step of weaving the fiber-optic strands together as the warp strands with filaments of plastics or metal as the weft strands.

14. The method according to claim 11, further comprising the step of pseudo-randomly breaking the fibers by stress exerted on the strands during the weaving operation.

15. The method according to claim 14, further comprising the step of pseudo-randomly breaking the fibers by stress exerted on the strands during the weaving operation.

* * * * *